(12) United States Patent
Wu

(10) Patent No.: US 7,471,685 B2
(45) Date of Patent: Dec. 30, 2008

(54) ANALYSIS OF A DATA TRANSMISSION SYSTEM

(75) Inventor: Raymond Wu, Schmitten (CH)

(73) Assignee: Ascom (Schweiz) AG, Bern (CH)

( * ) Notice: Subject to any disclaimer, the term of this patent is extended or adjusted under 35 U.S.C. 154(b) by 951 days.

(21) Appl. No.: 10/214,354

(22) Filed: Aug. 8, 2002

(65) Prior Publication Data

US 2003/0031136 A1      Feb. 13, 2003

(30) Foreign Application Priority Data

Aug. 9, 2001    (EP) .................... 01810767

(51) Int. Cl.
*H04L 12/56* (2006.01)

(52) U.S. Cl. .................. 370/395.21; 370/230; 370/252

(58) Field of Classification Search ................ 370/230, 370/232, 234, 235, 252, 253, 352, 353, 354, 370/355, 356, 395.21
See application file for complete search history.

(56) References Cited

U.S. PATENT DOCUMENTS

| | | | | | |
|---|---|---|---|---|---|
| 5,519,689 | A | * | 5/1996 | Kim | 370/232 |
| 5,793,976 | A | * | 8/1998 | Chen et al. | 709/224 |
| 6,028,840 | A | * | 2/2000 | Worster | 370/230 |
| 6,233,449 | B1 | * | 5/2001 | Glitho et al. | 455/423 |
| 6,304,551 | B1 | * | 10/2001 | Ramamurthy et al. | 370/232 |
| 6,438,376 | B1 | * | 8/2002 | Elliott et al. | 455/437 |
| 6,577,648 | B1 | * | 6/2003 | Raisanen et al. | 370/503 |
| 6,788,933 | B2 | * | 9/2004 | Boehmke et al. | 455/423 |
| 6,804,244 | B1 | * | 10/2004 | Anandakumar et al. | 370/395.21 |
| 6,807,156 | B1 | * | 10/2004 | Veres et al. | 370/252 |
| 6,891,798 | B1 | * | 5/2005 | Yip et al. | 370/230 |
| 6,912,232 | B1 | * | 6/2005 | Duffield et al. | 370/468 |
| 6,956,819 | B1 | * | 10/2005 | Yamada et al. | 370/230 |
| 6,967,921 | B1 | * | 11/2005 | Levy et al. | 370/230.1 |
| 6,987,729 | B1 | * | 1/2006 | Gopalakrishnan et al. | 370/230 |
| 7,145,871 | B2 | * | 12/2006 | Levy et al. | 370/229 |
| 2002/0075830 | A1 | * | 6/2002 | Hartman, Jr. | 370/333 |
| 2004/0090923 | A1 | * | 5/2004 | Kan et al. | 370/252 |
| 2006/0050623 | A1 | * | 3/2006 | Hartman, Jr. | 370/204 |
| 2006/0227741 | A1 | * | 10/2006 | Lappetelainen | 370/329 |

FOREIGN PATENT DOCUMENTS

| | | |
|---|---|---|
| EP | 0 786 883 A | 7/1997 |
| EP | 0 984 645 A | 3/2000 |
| EP | 1 079 647 A1 | 2/2001 |
| WO | 00/70897 A | 11/2000 |

\* cited by examiner

*Primary Examiner*—Chi H. Pham
*Assistant Examiner*—Kevin Mew
(74) *Attorney, Agent, or Firm*—Birch, Stewart, Kolasch & Birch, LLP

(57) ABSTRACT

In a data transmission system, the QOS (quality of service) is continuously monitored (15) by measuring certain system parameters. If too low a QOS is found (16), individual or a number of further tests (19, 20, 21) are automatically and immediately started in order to determine the information about the system state which is required for locating the cause of the low QOS. Apart from the measurement of particular system parameters, these tests also comprise the collecting of certain quantities already present in the system. A test can also start other additional tests (22, 23), the individual tests being configured in dependence on the system parameters already known, in such a manner that they provide meaningful results for the current conditions.

10 Claims, 2 Drawing Sheets

ANALYSIS OF A DATA TRANSMISSION SYSTEM

TECHNICAL FIELD

The invention relates to a method and a device for analyzing a data transmission system in which a quality of service is monitored by means of the repeated measurement of a particular number of system parameters.

PRIOR ART

Data transmission systems are complex objects. It is frequently hardly possible to detect disturbances or configuration errors directly. They only manifest themselves by a reduced quality of service for the users such as for example, interruptions in the connection, slow data transmissions or a poor transmission quality. The monitoring of the quality of service is one of the important tasks of a system operator.

In known systems, the values of some system parameters are determined, for example, and the quality of service is then inferred from these values. Thus, for instance, the data throughput is determined by means of test connections by transmitting a particular volume of data and measuring the time for their transmission. Another parameter is the so-called "round trip delay", i.e. the period of time needed by a particular message for passing from one point of the network to another and back again. The time needed for downloading, for example, a particular internet page can also be taken into consideration in determining the quality of service.

Since the state of such data transmission systems can change decisively within a short time, two identical measurements may lead to completely different results within the period of a few seconds in certain circumstances, i.e. the result of a particular measurement is only meaningful for the conditions prevailing at the instant of the measurement. It is not possible to provide a general statement.

A further problem consists in that, although these parameters can assist in providing an overview of the current quality of service, they do not provide any indications for the location of the cause of an inadequate quality of service.

EP 1 079 647 provides a solution to this problem. The device described therein is capable of documenting not only the quality of service of a system but also of providing indications of the causes of existing problems. For this purpose, an abundance of network parameters is determined by means of a multiplicity of test connections, which are entered in a database. The causes of problems can be located by means of an elaborate, systematic but automated evaluation of these parameters.

However, the method operates off-line, i.e. the data are detected in a first step and are evaluated only later. Since it is not clear from the start what parameters must be present for fault analysis in a particular situation, all parameters must always be detected and stored. This is very complex, and a large proportion of the effort is made in vain since later many parameter values are not needed for the evaluation. In addition, the network loading is increased by the additional test connections and the system itself is greatly influenced by the measurement which is why the results may not reproduce the real situation in certain circumstances.

DESCRIPTION OF THE INVENTION

It is the object of the invention to specify a method and a device of the type initially mentioned, by means of which the problems of the prior art can be avoided and both the quality of service can be determined and the causes of a reduced quality of service can be located.

The object is achieved by the features of claim 1. According to the invention, the quality of service is continuously monitored by means of the repeated measurement of a particular number of system parameters in the method for analyzing a data transmission system. If an inadequate quality of service is found, further information about the data transmission system is immediately determined by determining further system parameters and collecting needed data. Using the further information and the known system parameters, it is finally possible to infer possible causes of the inadequate quality of service.

The method according to the invention makes it possible to respond immediately to an inadequate quality of service and to determine the system parameters of importance in the respective context by means of suitable tests and a selective data procurement. If there is a problem, it is thus possible to detect not only the effect, i.e. an inadequate resulting quality of service but, at the same time, it is also possible to register the current system state. This, in turn, allows the possible causes to be located which have led to the inadequate quality of service and subsequently to take suitable measures for eliminating the causes found.

Monitoring the quality of service of the data transmission system requires information about the system. This information or these data, respectively, can be procured in various ways. One possibility consists in procuring these data by means of special test connections which are set up especially for this purpose. However, such test connections will always load the communication network with additional data traffic which is why the full capacity of the network is not available to the users for useful connections during this time. In addition, the network to be tested is itself influenced by these test connections so that the resultant measurement results may not supply a correct impression of the network.

It is thus of advantage to procure the necessary information and data about the system by means of useful connections and to use this information essentially for monitoring the quality of service. This makes it possible to restrict to a minimum the loading on the network due to additional test traffic.

The method is suitable for various types of data transmission systems. For example, it is suitable for systems with wire-connected and wireless message communication, for systems with point-to-point connections and for systems with packet switching, for systems with data services and for systems with voice services or for mixed forms of such systems.

In particular, however, the method is suitable for mobile radio systems such as, for example, GSM (global system for mobile communications), GPRS (general packet radio service) or UMTS (universal mobile telecommunication system) in which the system state can change decisively within seconds. In such systems, it is difficult to measure and to predict the network performance or the quality of service, respectively, since these quantities depend on many different factors such as, for example, the respective volume of traffic, the current routing and the capacity and speed of the network elements involved. In particular, this applies to mobile radio systems with packet-based data transmission such as, for example, the IP (Internet Protocol).

If an inadequate quality of service, called QOS hereinafter, is found during the systematic monitoring of the network, the response is immediate and the information relevant to the respective situation, i.e. for example data on the system state, is procured. Instead of detecting and recording continuously all parameters which may be necessary and analyzing these later off-line, individual or a number of tests are specifically started at the instant at which a problem occurs in order to procure the necessary information on the system state for the purpose of problem analysis.

These tests, which can be performed simultaneously and/or in succession, comprise, on the one hand, procedures for measuring the values of particular network parameters and, on the other hand, also the detection and recording of certain data already existing in the system which only need to be collected.

The QOS is monitored by means of the continuous checking of certain network parameters. For example, it is monitored whether the values of these parameters are within the predetermined limits or outside the allowed ranges or whether inadmissible combinations of parameter values are present. It is also possible to monitor whether a parameter value is outside the predetermined limits for only a short time or for a relatively long time, and only the latter is detected as an error and correspondingly pursued further. The conditions for the presence of an error, i.e. when there is an inadequate QOS, can either be predetermined, varied by the network administrator or even made dependent on the current network state.

When a problem occurs, i.e. when the respective conditions for an inadequate QOS are met, it would be possible to always start the same selection of tests, in principle, and the configuration and the sequence of tests would always be the same. To keep the expenditure down, however, it is of advantage that the selection of the tests to be performed and their configuration and/or their sequence take place in dependence on the respective situation. Using an intelligent control, the tests to be performed can thus be made in dependence on the current system parameters monitored, i.e. those already known, and/or in dependence on the parameter values found.

A flexibility is thus achieved which allows a selective response to particular problems and situations and correspondingly provides for simple and fast locating of the causes of a problem.

These tests contain all the possible procedures for finding the current system state, and it is possible to collect an arbitrary amount of data. However, it is preferred to perform tests of a type which load the data transmission system as little as possible with additional data traffic. On the one hand, this provides for a faster problem analysis and, on the other hand, the results obtained are more reliable since the tests do not change the system state to an unnecessary extent.

At any time, individual or a number of tests are typically running in a data transmission system for the purpose of system monitoring. These tests typically continue to run even when an inadequate QOS is found. To further reduce the network loading and falsify the results even less, tests already started when problems occur but which have become superfluous are advantageously aborted prematurely. It is also advantageous to similarly abort running tests which have already fulfilled their task.

In principle, such a method could also be implemented by means of a manual control which, however, would necessitate the permanent presence of the appropriate personnel. This is not only expensive but also necessitates a high level of training of the personnel. In addition, it is difficult to make the correct decisions within a few seconds at the decisive moment.

It is, therefore, of advantage if the method runs automatically and that the system is correspondingly programmed, for example. This makes it possible to save on expensive personnel and ensures that the system, when problems occur, responds within a useful time before the system state has changed again. Locating the intelligence in the test system ensures that the system always responds correctly to any problem and supplies reliable results. This also makes it possible to extend the system continuously with the latest findings in order to accelerate and to improve the location of causes and elimination of problems.

The device according to the invention for analyzing a data transmission system has first means for determining the quality of service of the data transmission system. Furthermore, second means are provided for determining further information about the data transmission system with the aid of which, for example, the system state can be determined. In order to be able to respond as quickly as possible in the case of a problem, third means are provided which immediately activate the second means when an inadequate quality of service is found. In addition, the device comprises fourth means for locating and/or determining the possible causes of the inadequate quality of service by means of the further information and the known system parameters.

Monitoring the QOS supplies the required information for being able to respond immediately to a low QOS and collecting the necessary data and performing the necessary measurements, respectively, so that the current system state can be determined and the possible causes can be located.

The device according to the invention can be implemented in various ways. For example, it could be implemented as a hard-wired electronic circuit or also as a stored-program control. However, it is preferably constructed as a programmable data processing device, for example as a microprocessor with associated memory. For example, it is constructed as a physical unit and can be integrated into the data transmission system as an independent device in that it can be connected to the corresponding network elements. However, it can also be constructed as a logical unit, for example, in the form of a software module which is installed on an existing device of the data transmission system which has a microprocessor.

The subsequent detailed description and the totality of the patent claims provide further advantageous embodiments and combinations of features of the invention.

BRIEF DESCRIPTION OF THE DRAWINGS

In the drawings used for explaining the exemplary embodiment.

In principle, identical parts in the figures are provided with identical reference symbols.

APPROACHES FOR CARRYING OUT THE INVENTION

Figure 1:
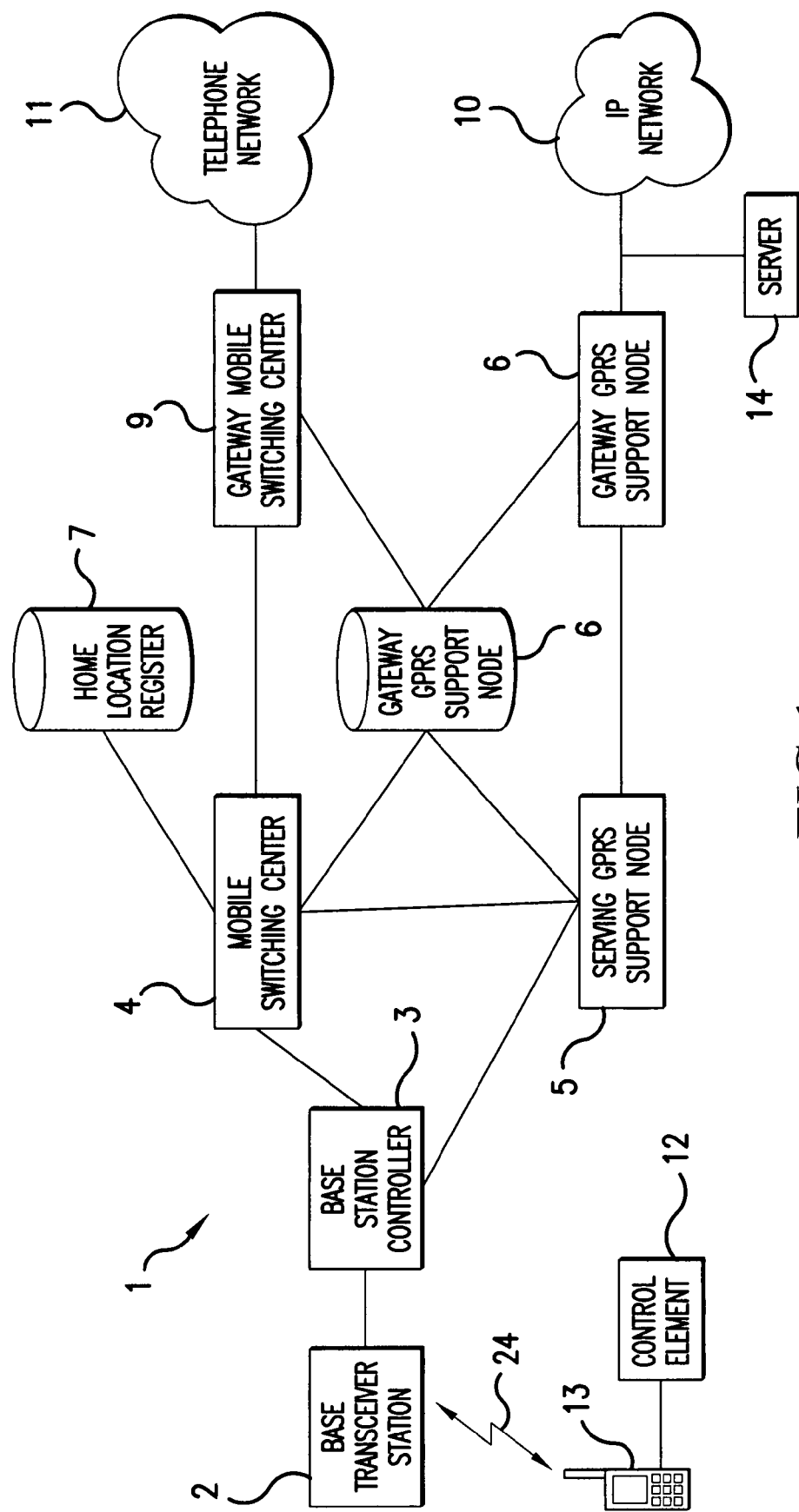
FIG. 1 shows a GPRS communication network shown diagrammatically.

FIG. 1 diagrammatically shows a GPRS network 1. Among other things, it comprises the following components: a BTS 2 (base transceiver station), a BSC 3 (base station controller), an MSC 4 (mobile switching center), an SGSN 5 (serving GPRS support node), a GGSN 6 (gateway GPRS support node), an HLR 7 (home location register), a VLR 8 (visitor location register) and a GMSC 9 (gateway mobile switching center). The GPRS network 1 is connected to an IP network 10 such as, for example, the Internet via the GGSN 6 and to a telephone network 11 such as, for example, a conventional PSTN or an ISDN network via the GMSC 9.

To monitor the QOS of the GPRS network 1, a control element 12 is also provided which is connected, for example, to a user device 13 or is integrated therein. The control element 12 could also be connected to the GPRS network 1 at a different location or integrated into one of the network elements already existing. The control element 12 monitors, for example, FTP (file transfer protocol) data transmission in the GPRS network 1. A user who is currently located, for example, within the range of the BTS 2, downloads a file, for example by FTP, from a server 14 of the IP network 10 to its user device 13. This process is monitored by the control element 12 in that it systematically monitors the results of such data transmissions, for example the resultant data rate in such a file transfer.

Figure 2:
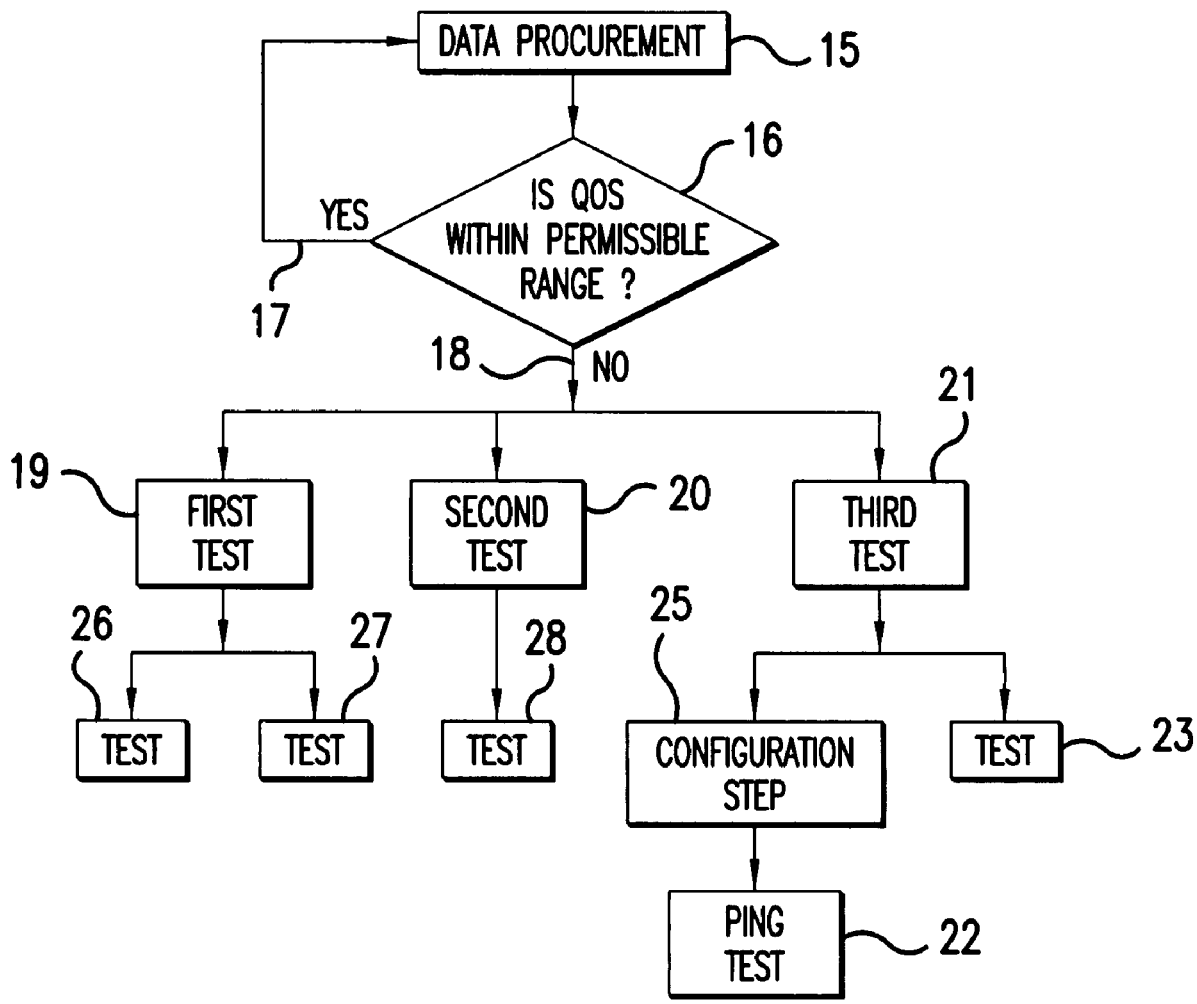
FIG. 2 shows a block diagram of the method according to the invention.

FIG. 2 diagrammatically shows this method. Such file transfers are monitored, for example, in that in a data procurement step 15 the necessary parameters for determining the resultant data rate of FTP file transfers are continuously determined. These parameter values are analyzed in a test step 16. If the test 16 shows that the QOS is within the permissible range 17, the control element 12 jumps back to the data procurement step 15. If, in contrast, it finds that the QOS is inadequate 18 due to the currently applicable conditions, that, for example, the resultant data rate is below the predetermined threshold in an FTP file transfer, this is detected as an error and the control element 12 immediately initiates corresponding measures for locating the cause of this problem.

The measures which are taken depend on the programming of the control element 12. In the present example, other different tests can be started in dependence on the access to other network elements and/or in dependence on relevant results of other tests. A first test 19 consists in checking the SGSN 5, a second test 20 consists in checking the GGSN 6 or a third test 21 consists in starting other tests in order to obtain additional information. It is possible to perform both individual tests and a number of tests 19, 20, 21 simultaneously or in succession.

The two tests 19 and 20 are used for checking the conditions in the SGSN 5 and in the GGSN 6, respectively, with regard to their instantaneous traffic loading. From these traffic conditions it can be inferred whether the inadequate QOS is actually attributable to an overloading of one of the two network nodes. After these tests 19, 20 have been processed, other tests 26, 27, 28 can be performed again in dependence on all known information.

The third test 21 can also comprise any other tests. In the present case, the control element is programmed, for example, in such a manner that it is not the test 23 but a PING test 22 which is started. In this process, a single data packet (a so-called ICMP echo request packet) is sent from the user device 13 to the server 14 under the control of the control element 12.

If the server 14 receives this data packet, it immediately sends it back to the user device 13. The round trip delay, i.e. the period for which this data packet is travelling provides information about the location of the cause for the reduced QOS. If the round trip delay is large, this indicates that the problem is in the SGSN 5, that it is, for example, currently overloaded. If, in contrast, the round trip delay is small, the cause of the low QOS is probably in the radio interface 24 between the user device 13 and the BTS 2. This is because poor radio conditions in many cases lead to faulty data transmissions which, in turn, requires a retransmission of the faulty data packets.

However, before the PING test 22 is started, a configuration step 25 first follows during which the subsequent PING test 22 is configured in such a manner that the test results supplied are meaningful with respect to the real situation. In the case of an FTP file transfer, the data must be typically divided over a number of data packets and the speed with which a data packet travels in an IP network depends on its size. To optimally use the available transmission capacity, the data packets are made as large as possible in the case of an FTP file transfer and the maximum size of a data packet is restricted. If then a short data packet is transmitted in the PING test 22, the resultant round trip delay will not provide any information on the current transmission conditions for the long FTP data packets. The PING test 22 is configured, therefore, in such a manner that the length of the data packet transmitted from the user device 13 to the server 14, and vice versa, approximately corresponds to the length of the data packets in an FTP file transfer. This ensures that the PING data packet receives the same treatment as the FTP data packets during a transmission. This, in turn, ensures that the test result provides the best possible impression of the current transmission conditions.

PING tests are very well suited for analyzing a data transmission system since they generate virtually no additional data traffic and, accordingly, only minimally load the network with unnecessary traffic. The test results are correspondingly reliable since the system to be tested is only minimally influenced itself by the test.

The entire procedure, i.e. from the data procurement 15 to the processing of the last test, of the PING test 22 in this case, proceeds automatically and rapidly. The control element 12 is programmed in such a way that the response to any possible fault situation is correct and fast, i.e. the most suitable tests are performed so that all necessary information for locating the causes of the fault are available before the state of the data transmission system has changed.

Whilst the respective tests are processed after the occurrence of an inadequate QOS 18, the monitoring of the QOS, i.e. the data procurement 15, continues. Thus, it is also possible to detect and pursue other faults if they occur shortly after another fault and the control element 12 is programmed in such a manner that a fault which occurs several times in brief succession only triggers the subsequent tests a single time.

If the cause of a QOS which is too low has been located with sufficient accuracy, the control element 12 stops all tests which have become superfluous, so that the loading on the network can be reduced.

Naturally, the cause of the fault can also be eliminated automatically or the system administrator is informed about the fault found and its possible cause so that he can initiate the corresponding measures required.

In summary it must be noted that the invention makes it possible to respond immediately when a problem occurs, that is to say in the case of too low a QOS, and to initiate the necessary measures in order to determine the information on the system state required for locating the causes of the reduced QOS before the system state changes. In addition, it is possible to extend the system continuously with the latest findings by simply changing the programming of the control element 12 accordingly.

The invention claimed is:

1. A method for locating causes of a reduced quality of service of a data transmission system, comprising the steps of:
   monitoring the quality of service by repeatedly measuring a particular number of system parameters,
   determining a reduced quality of service by determining whether a value of at least one system parameter or a combination of values of a plurality of system parameters is located outside an allowed range; the method further comprising:
   monitoring the quality of service with a control element which is in the form of a physical or logical unit and which is connected to a user device or, at another location, to the data transmission system or which is integrated in the user device or in one of the already-existing network elements;

automatically carrying out additional tests with the control element at the instant at which the control element determines a reduced quality of service in order to determine additional information concerning a system state of the data transmission system; and locating the causes of the reduced Quality of service with the control element on the basis of the measured values of the system parameters and the additional information.

2. The method as claimed in claim 1, wherein essentially information, which is procured by useful connections, is used for monitoring the quality of service.

3. The method as claimed in claim 1, wherein the causes of a reduced quality of service of a mobile telecommunications system, particularly a mobile telecommunications system having a packet-based data transmission system, are located.

4. The method as claimed in claim 1, wherein the further information concerning the system state of the data transmission system is determined by the control element carrying out one or a multiplicity of tests simultaneously and/or successively.

5. The method as claimed in claim 4, wherein the control element determines the reduced quality of service on the basis of particular parameter values of the system parameter(s), a selection, a configuration and/or a sequence of the tests to be performed being effected in dependence on the system parameters monitored and/or the parameter values detected.

6. The method as claimed in claim 4, wherein the control element carries out tests which provide only little loading on the data transmission system.

7. The method as claimed in claim 1, wherein the control element aborts a current test if the test has fulfilled its task or if it has become superfluous.

8. The method as claimed in claim 1, which runs automatically.

9. A device for locating causes of a reduced quality of service of a data transmission system having a control element which comprises:

first means for determining a quality of service of the data transmission system by means of repeated measurement of a particular number of system parameters and the first means are in such a form that a reduced quality of service can be determined in that it is possible to determine whether a value of at least one system parameter or a combination of values of a plurality of system parameters is located outside an allowed range, wherein the control element is in the form of a physical or logical unit, is connected to a user device or, at another location, to the data transmission system or is integrated in the user device or in one of the already existing network elements, second means for determining additional information concerning a system state of the data transmission system by automatically carrying out additional tests;

third means for activating the second means, the device being constructed in such a manner that the second means can be activated by the third means at the instant at which a reduced quality of service is determined by the first means, and fourth means for locating the causes of the reduced quality of service on the basis of the measured values of the system parameters and the additional information.

10. The device as claimed in claim 9, wherein the control element is in the form of a programmable data processing device.

* * * * *